United States Patent
Ottomano et al.

(10) Patent No.: US 10,103,415 B2
(45) Date of Patent: Oct. 16, 2018

(54) BATTERY PACK WITH INTRACELL HEAT CONDUCTING MEMBERS

(71) Applicant: GM GLOBAL TECHNOLOGY OPERATIONS LLC, Detroit, MI (US)

(72) Inventors: Anthony Ottomano, Warren, MI (US); Pablo Valencia, Jr., Northville, MI (US); Andrew H. Leutheuser, Northville, NC (US)

(73) Assignee: GM Global Technology Operations LLC, Detroit, MI (US)

(*) Notice: Subject to any disclaimer, the term of this patent is extended or adjusted under 35 U.S.C. 154(b) by 263 days.

(21) Appl. No.: 15/014,567

(22) Filed: Feb. 3, 2016

(65) Prior Publication Data
US 2017/0222284 A1    Aug. 3, 2017

(51) Int. Cl.
| | |
|---|---|
| *H01M 10/6553* | (2014.01) |
| *H01M 10/6557* | (2014.01) |
| *H01M 10/0525* | (2010.01) |
| *H01M 10/613* | (2014.01) |
| *H01M 2/02* | (2006.01) |
| *H01M 10/647* | (2014.01) |
| *H01M 10/654* | (2014.01) |

(52) U.S. Cl.
CPC ..... *H01M 10/6553* (2015.04); *H01M 2/0287* (2013.01); *H01M 10/613* (2015.04); *H01M 10/647* (2015.04); *H01M 10/654* (2015.04); *H01M 10/6557* (2015.04); *H01M 10/0525* (2013.01)

(58) Field of Classification Search
CPC ......... H01M 10/6553; H01M 10/6557; H01M 10/613; H01M 10/0525; H01M 2/02; H01M 2/0287; H01M 2/021; H01M 2/0207
See application file for complete search history.

(56) References Cited

U.S. PATENT DOCUMENTS

| | | | |
|---|---|---|---|
| 2011/0039134 A1* | 2/2011 | Kim | H01M 2/22 429/7 |
| 2012/0237815 A1* | 9/2012 | Kwak | H01M 2/0207 429/120 |
| 2013/0164594 A1* | 6/2013 | Zahn | H01M 2/021 429/120 |
| 2014/0363719 A1* | 12/2014 | Kwak | H01M 10/5016 429/120 |
| 2015/0221995 A1 | 8/2015 | Robert et al. | |

* cited by examiner

*Primary Examiner* — Karie O'Neill Apicella
(74) *Attorney, Agent, or Firm* — Quinn IP Law

(57) ABSTRACT

A battery cell includes a pouch, an electrolyte material, positive and negative electrodes, and one or more heat conducting members. The pouch has an inner surface defining an internal volume, within which is contained the electrolyte material. The electrodes form current collectors that are positioned within the internal volume of the pouch. The electrode terminals are connected to a respective one of the positive and negative electrodes. Each heat conducting member is in thermal communication with a respective electrode terminal fully within the internal volume of the pouch, and extends between the electrodes and the inner surface of the pouch. The heat conducting members form a parallel heat transfer path within the battery cell. A battery pack includes a housing containing multiple such battery cells.

20 Claims, 3 Drawing Sheets

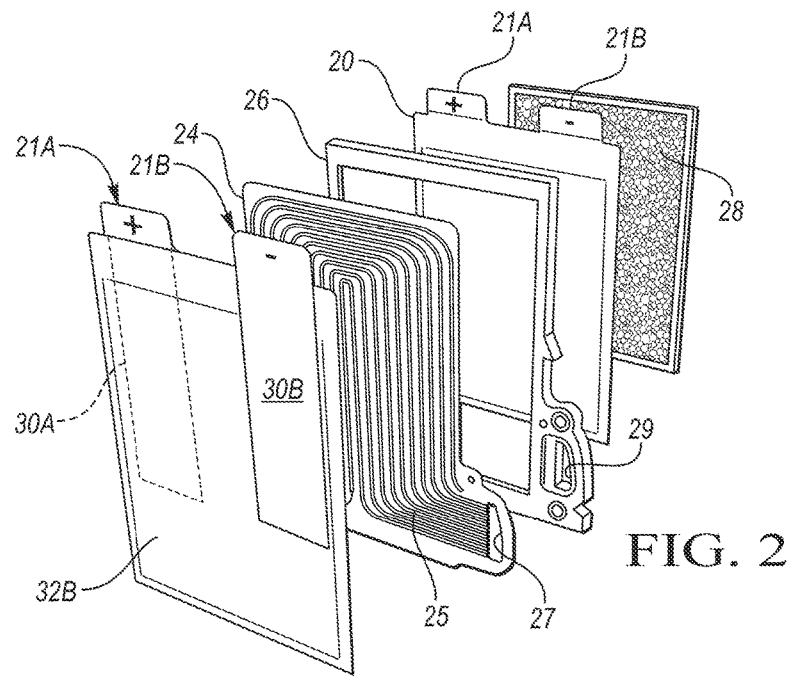
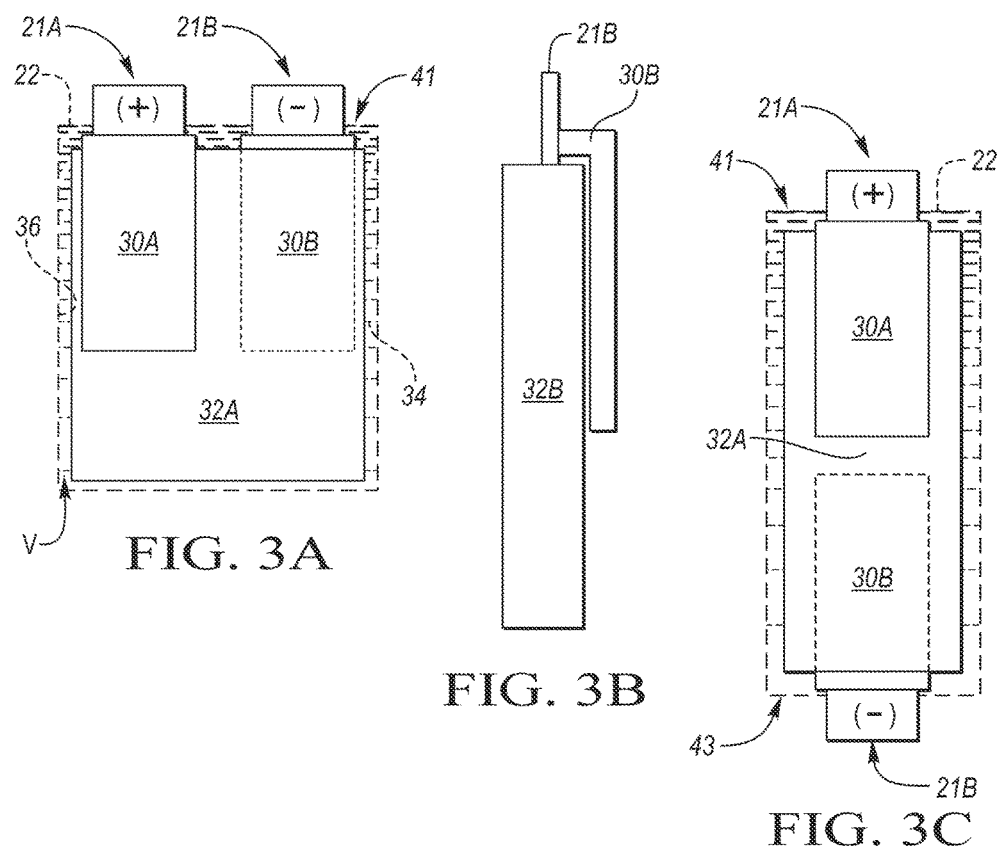

BATTERY PACK WITH INTRACELL HEAT CONDUCTING MEMBERS

TECHNICAL FIELD

The present disclosure relates to a battery pack with intracell heat conducting members.

BACKGROUND

A battery pack typically includes multiple rechargeable battery cells. High-voltage battery packs, such as those used to power a torque-generating electric machine, can generate substantial amounts of heat during sustained operation. As a result, a battery thermal management system is typically used to regulate battery cell temperature. For instance, coolant may be circulated in a closed-loop channel located near the battery cells. Thin thermal plates referred to as cooling fins may be used to help direct circulated coolant between adjacent battery cells to facilitate cooling.

In some battery cells, an insulating separator material may be arranged between oppositely-charged electrodes and enclosed within a sealed outer pouch filled with an electrolyte solution. The separator material, e.g., polyethylene and/or polypropylene film, helps prevent an electrical short condition while permitting the free transfer of electrical charge between electrodes. Positive and negative cell tabs of the battery cell, which are electrically connected to the respective electrodes, extend a short distance outside of the sealed pouch to form electrode terminals for the battery cell. The electrode terminals of multiple battery cells are typically ultrasonically welded together via a conductive interconnecting member positioned outside of the battery cells in order to form the battery pack.

SUMMARY

A battery cell is disclosed herein that includes a pouch, positive and negative electrodes, positive and negative electrode terminals, and one or more heat conducting members. The positive and negative electrode terminals are connected to the respective positive and negative electrodes. Each heat conducting member is in thermal communication with a respective electrode terminal, and is positioned fully within the internal volume of the pouch, i.e., is "intracell" as that term is used herein. The intracell heat conducting members as used herein extend between the electrodes and an inner surface of the pouch to form a parallel heat transfer path within the pouch as set forth below.

The electrodes are enclosed within the disclosed pouch-style battery cells, and may be optionally constructed of copper, aluminum, or another electrically conductive material. As such, the electrodes efficiently transfer heat relative to the various layers of active material, e.g., lithium transition metal oxides (cathode) and carbonaceous materials (anode), the electrically insulating separator material, and the electrolyte fluid contained within the internal volume of the pouch. The different thermal properties of the various cell components can lead to temperature gradients between the electrode terminals. Therefore, the battery pack is configured as described below to help cool the individual battery cells in a more efficient manner relative to conventional approaches, specifically by drawing heat away from a weld zone having a relatively high current density, and as a result, high temperature. With respect to the planes of the individual electrodes, a parallel heat transfer path is provided by the heat conducting member(s), which in turn helps avoid large temperature gradients as noted above. As a result, lower average cell temperatures are attainable with the same amount of coolant flow relative to conventional battery cooling methodologies.

A battery pack is also disclosed herein that includes a housing and a plurality of the battery cells having the intracell heat conducting member(s) as noted above. The battery cells are positioned within the housing.

The above features and advantages and other features and advantages will be readily apparent from the following detailed description when taken in connection with the accompanying drawings.

BRIEF DESCRIPTION OF THE DRAWINGS

FIG. 2 is a schematic perspective exploded view illustration of a portion of the multi-cell battery pack shown in FIG. 1.

FIGS. 3A-C are schematic view illustrations of an example battery cell configured with intracell heat conducting members according to the present disclosure.

DETAILED DESCRIPTION

Figure 1:
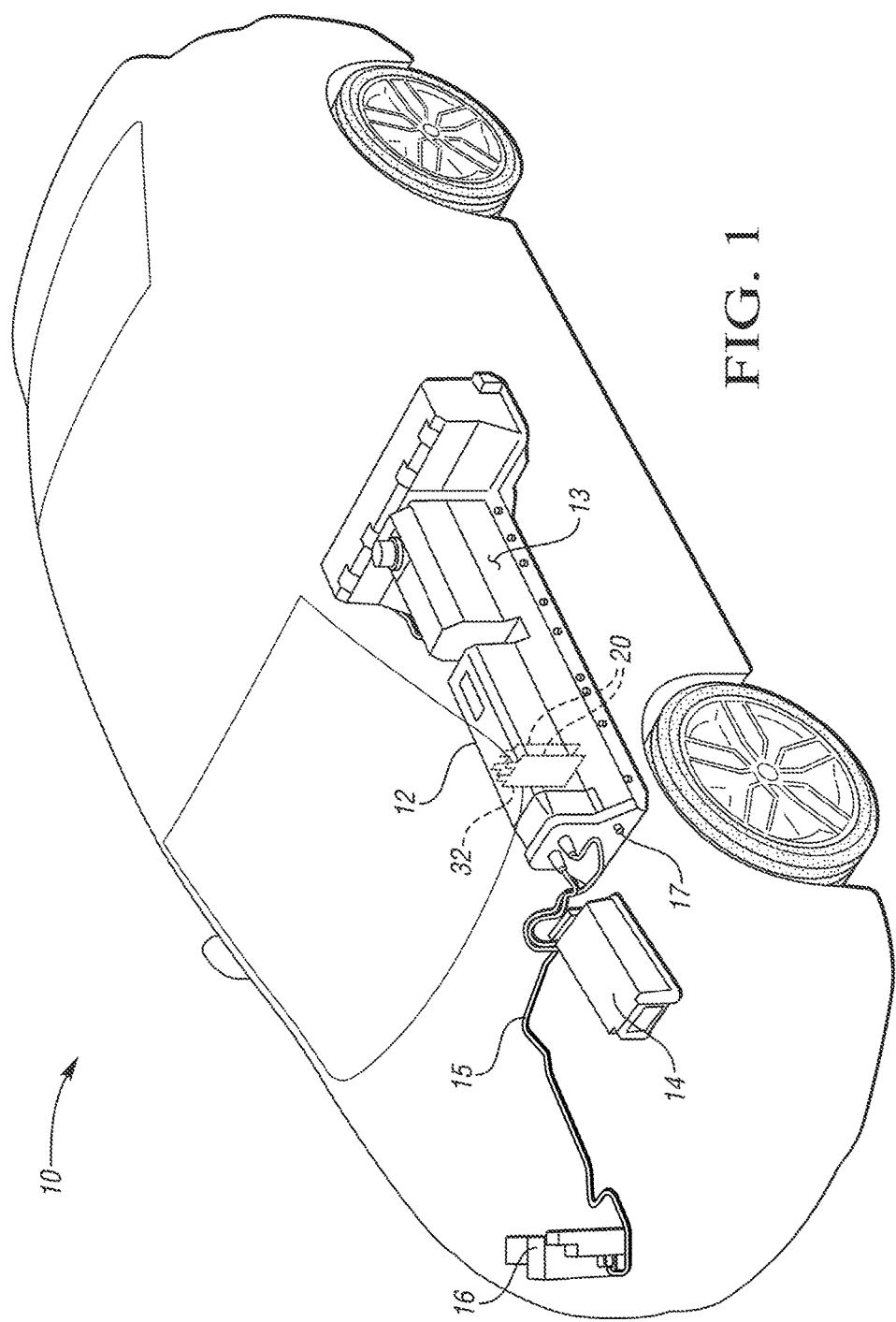
FIG. 1 is a schematic illustration of an example system using a multi-cell battery pack with one or more intracell heat conducting members as described herein.

Referring to the drawings, wherein like reference numbers refer to like components throughout the several views, an example system 10 is shown in FIG. 1 having a direct current (DC) battery pack 12. The battery pack 12 includes a plurality of pouch-type battery cells 20, two of which are shown in FIG. 1 for illustrative simplicity. As set forth below with reference to FIGS. 2-4B, each battery cell 20 includes electrodes 32 and at least one intracell heat conducting member, e.g., respective first and second intracell heat conducting heat conducting members 30A and 30B in a non-limiting embodiment, each in thermal communication with a positive or negative electrode terminal 21A or 21B. Each heat conducting member 30A and 30B is positioned fully within a sealed pouch 22 of each battery cell 20 to form a parallel heat transfer path as explained below.

The battery pack 12 of FIG. 1 may be configured as a rechargeable lithium-ion battery pack in an example embodiment. The battery pack 12 includes a housing 13, e.g., a T-shaped housing as shown. The battery pack 12 may contain a plurality of identically-configured battery cells 20. One possible configuration of the battery pack 12 includes at least 192 such battery cells 20 collectively outputting at least 18 kWh of electrical power, although the battery pack 12 is not limited to such an embodiment. The housing 13 may be in fluid communication with a source of coolant (not shown), e.g., via a coolant port 17, with admitted coolant circulating with respect to the battery cells 20 to help regulate a temperature of the battery cells 20 of the battery pack 12. Other embodiments may be envisioned having different shapes, power ratings, and/or active materials other than lithium ion-based chemistries, and therefore the T-shaped configuration of FIG. 1 is exemplary and non-limiting.

The system 10 of FIG. 1 may be configured as a mobile or a stationary system of any type that may benefit from the use of electrical energy stored in the various battery cells 20. Examples of the system 10 may include a vehicle as shown, e.g., an extended-range electric vehicle, a plug-in hybrid electric vehicle, a battery electric vehicle, or another mobile platform, robot, or stationary/non-vehicular system such as a power plant.

The system 10 may further include an electric machine (not shown) such as a traction motor and/or a motor/generator unit that is powered by energy from the battery pack 12. Additionally, the system 10 may include a power inverter 14 that is electrically connected to a charging module 16 via high voltage cables 15. The power inverter 14 receives alternating current (AC) power from the charging module 16 when the charging module 16 is plugged into an available charging outlet (not shown). The power inverter 14 may use pulse-width modulation or other power switching techniques to transform the AC voltage from the charging module 16 into a DC voltage suitable for charging the battery cells 20, as is well known in the art.

Figure 4A:
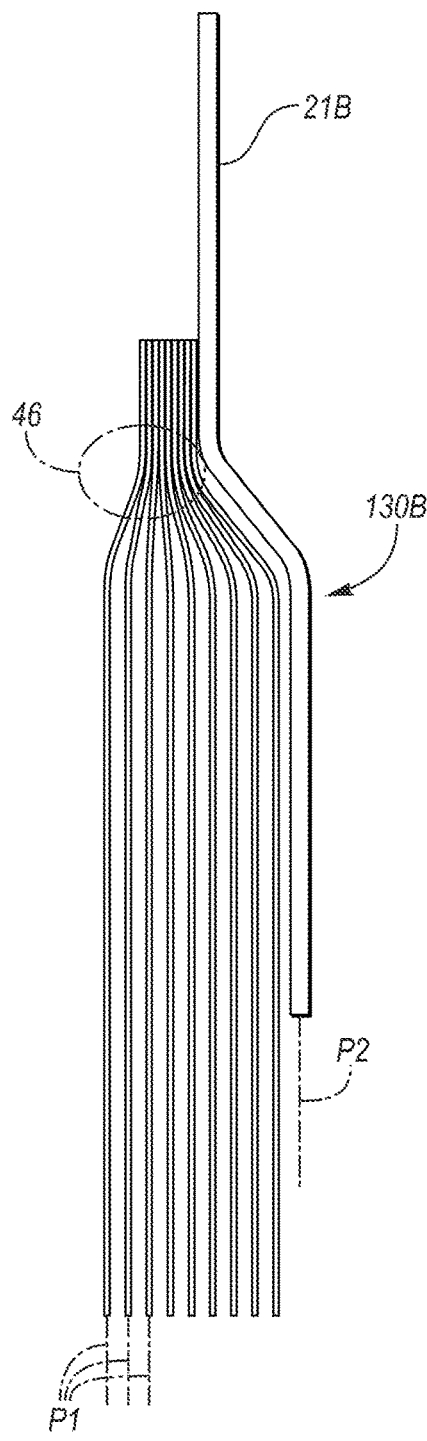
FIGS. 4A-4B are schematic side view illustrations of electrodes and the intracell heat conducting members shown in FIGS. 3A-C.
Figure 4B:
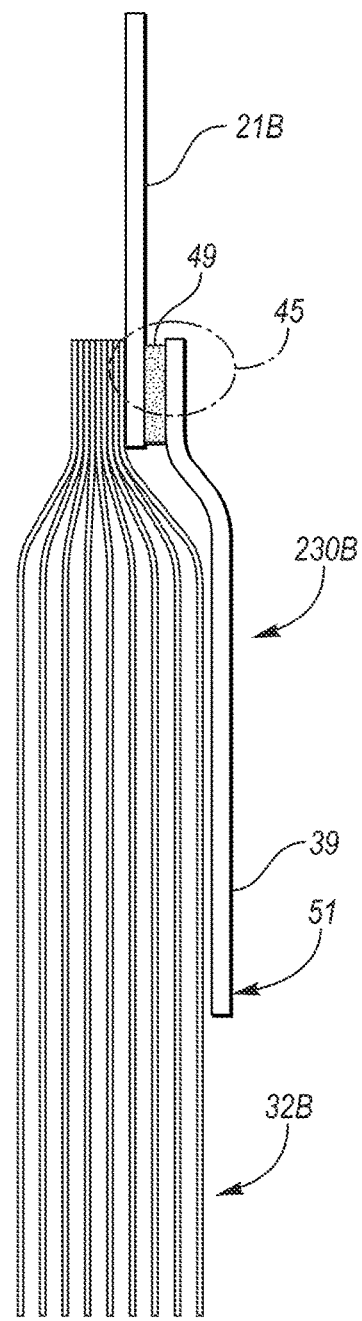

Referring to FIG. 2, each battery cell 20 includes a positive (+) electrode terminal 21A and a negative (−) electrode terminal 21B. The electrode terminals 21A and 21B are adjoined to a respective charge-specific electrode 32A or 32B, and may be formed by coating a strip-shaped metallic plate or sheet with a suitable active material such as a lithium transition metal oxide (cathode) or carbonaceous material (anode), as well as a binder and an electrically conductive material such as copper or aluminum. The electrodes 32A and 32B, shown generally in FIG. 1 as the electrodes 32, are shown schematically in FIGS. 2-3C as a stack of electrodes 32A and 32B for illustrative simplicity. However, those of ordinary skill in the art will appreciate that a given electrode may be embodied as a thin layer or sheet as shown in FIGS. 4A-B, including a current collector of approximately 15 micrometers (μ) in thickness coated on both sides with a suitable active material that is approximately 40μ thick. The layers are then alternatively stacked through the thickness of the battery cell 20.

When a particular battery cell 20 discharges electrical energy in an example lithium-ion embodiment of the battery pack 12 shown in FIG. 1, lithium ions transfer through an electrolyte material (see FIG. 3A) from the negative electrode terminals 21B to the positive electrode terminal 21A. When the same battery cell 20 is actively charging, such as during regenerative braking in a vehicular embodiment of the system 10 or when charging the battery cells 20 using the charging module 16 of FIG. 1, the reverse process occurs, i.e., lithium ions transfer from the positive electrode terminal 21A to the negative electrode terminal 21B. A substantial amount of heat is generated during either process, with such heat dissipated via the parallel heat transfer path described below with reference to FIGS. 3A-4B.

The battery pack 12 of FIG. 1 may be optionally constructed using a repeating frame configuration in which a series of individual cell frames 26 constructed of, for instance, plastic or glass-filled polyamide, form a coolant manifold and also provide the required structural rigidity to the battery cells 20. For instance, two of the battery cells 20 may be arranged with respect to a pair of the cell frames 26, only one of which is shown in FIG. 2.

In a typical configuration, a pair of the battery cells 20 containing positive and negative electrodes 32A and 32B (see FIGS. 4A-4B), a thermal fin 24 defining internal coolant passages 25, and a foam divider 28 are sandwiched between adjacent cell frames 26 in a repeating arrangement throughout the housing 13 of the battery pack 12 shown in FIG. 1. The cell frames 26 and the thermal fins 24 respectively define major coolant channels 27 and 29 through which coolant (not shown) admitted via the coolant port 17 of FIG. 1 can circulate when a sufficient number of the cell frames 26, battery cells 20, thermal fins 24, and foam dividers 28 are connected together in a series arrangement.

With respect to the battery cells 20, each battery cell 20 includes a sealed pouch 22 constructed of laminated foil or other suitable material, e.g., a rectangular or square pouch of polymer-coated aluminum, and one or more of the heat conducting members 30A and/or 30B, only one of which is visible from the perspective of FIG. 2. Each heat conducting member 30A and 30B is arranged to form a parallel heat transfer path within the battery cell 20, with "parallel" taken with respect to the relationship of the orientations of the electrodes 32A and 32B to the heat conducting members 30A and 30B.

The arrangement and placement of the heat conducting members 30A and 30B take advantage of the thermal properties of the electrodes 32A, 32B in order to cool the electrodes 32A, 32B located farthest from the thermal fins 24 as effectively as the electrodes 32A, 32B located closest to the thermal fins 24. The heat conducting members 30A and 30B are in thermal communication with the respective negative and positive electrode terminals 21A and 21B within an internal volume (V) defined by the pouch 22. Thus, the heat conducting members 30A and 30B conduct heat from the electrodes 32A and 32B directly to the closest thermal fin 24 to facilitate cooling.

Referring to FIGS. 3A-C, the pouch 22 defines an inner surface 36 defining the internal volume (V). An electrolyte fluid 34 of the type described above is contained in the pouch 22 and fills the internal volume (V) thereof. The negative and positive electrodes 32A and 32B are positioned within the pouch 22 are respectively connected to the electrode terminals 21A and 21B, and thus form current collectors within the battery cell 20.

Each of the heat conducting members 30A and 30B is in thermal communication with the respective positive and negative electrode terminals 21A, 21B within the internal volume (V) of the pouch 22. As shown in FIG. 3B with respect to the heat conducting member 30B, the heat conducting members 30A and 30B extend between the inner surface 36 of the pouch 22. While FIGS. 3A and 3B depict side-by-side electrode terminals 21A and 21B such that the positive and negative electrode terminals 21B and 21A extend from a common edge 41 of the pouch 22, the present approach may also be used in end-to-end configurations as shown in FIG. 3C in which the electrode terminals 21A and 21B extend from opposite edges 41 and 43 of the pouch 22. The heat conducting members 30A, 30B should remain electrically isolated from the pouch 22 and from the electrodes 32A or 32B having an opposite charge relative to that of the heat conducting members 30A or 30B. Alternatively, the heat conducting members 30A and 30B should be made of an electrically-isolative but thermally-conductive material.

FIGS. 4A and 4B depict two possible example configurations of the heat conducting members 30A and 30B, i.e., an integrally-formed heat conducting member 130B and a two-piece heat conducting member 230B. The electrodes 32A and 32B may be configured as thin metallic sheets or plates that are ultrasonically welded or otherwise conductively joined together and to the respective electrode terminals 21A and 21B at a common first welding interface 46, as is known in the art, with the electrodes 32B and electrode terminal 21B shown from the perspective of FIGS. 4A-B. As such, the current density at the first welding interface 46, and thus the amount of local heat, is high relative to levels at other locations of the battery cell 20.

The embodiment of FIG. 4A effectively forms the heat conducting member 130B by extending the electrode terminal 21B along the outer surface of the electrodes 32B, with a plane P2 of the heat conducting member 130B generally parallel to the planes P1 of the individual electrodes 32B. The electrodes 32B are also parallel to the inner surface 36 of the pouch 22. The same arrangement may be provided for the electrodes 32A with respect to a heat conducting member (not shown) that is identical to heat conducting member 130B and used with the electrodes 32A. The heat conducting member 230B may be attached to one of the positive and negative electrode terminals, here shown as electrode terminal 21B, using an electrically insulating adhesive material 49 of the type known in the art.

FIG. 4B depicts an alternative embodiment in which the heat conducting member 230B is formed separately from the electrode terminal 21B and then ultrasonically welded or otherwise connected to the electrode terminal 21B at a second welding interface 45, e.g., using a thermally conductive adhesive, with the heat conducting member 230B extending along the electrodes 32B fully within the internal volume (V) of the pouch 22. The second welding interface 45 should maintain electrical isolation from the electrodes 32B if the heat conducting member 230B is constructed of an electrically conductive material. While the two-piece embodiment of FIG. 4B requires an extra manufacturing step, an advantage may lie in the ability to use a different material for the heat conducting member 230B and the electrode terminal 21B, the latter of which is typically thin aluminum or copper plate. In this manner, the configuration of FIG. 4B may be used to optimize the thermal transfer properties of the heat conducting member 230B.

Other embodiments may be envisioned within the intended inventive scope. For instance, it is possible to configure the electrode plate 32B that is located closest to the inner surface 36 of the pouch 22 to act as the heat conducting member 230B of FIG. 4B. To do this, an outer surface 39 of the heat conducting member 230B facing the inner surface 36 of the pouch 22 may be optionally coated with a thermally-conductive and electrically insulating material 51, e.g., a thermally-conductive insulating polymer.

Using the heat conducting members 30A and 30B or the variations thereof described above, the electrode terminals 21A and 21B are cooled at the same relative rate because all of the electrode terminals 21A and 21B are subject to roughly the same amount of thermal resistance through the added material of the heat conducting members 30A, 30B and from the pouch 22 to the thermal fin 24. As is known in the art, the conventional method of cooling a battery pack 12 allows the outermost electrodes 32A or 32B to cool more quickly than the innermost electrodes 32A or 32B.

Thus, the present approach contemplates placement of the heat conducting members 30A, 30B fully inside of the pouch 22 in order to give all of the electrodes 32A, 32B the same direct heat path to the circulating coolant and the thermal fins 24 shown in FIG. 2. Unlike conventional "can cell" configurations that use an aluminum outer cylinder in electrical contact with the positive electrode, the present approach maintains the electrical neutrality of the pouch 22. The present disclosure thus enables cooling of the electrodes 32A, 32B in a parallel path as opposed to a serial path, thereby facilitating more efficient and cost-effective cooling of battery packs having pouch-style cell designs such as the example battery pack 12 of FIG. 1. The configuration may be of particular benefit in higher-power applications with high current densities.

While the best modes for carrying out the disclosure have been described in detail, those familiar with the art to which this disclosure relates will recognize various alternative designs and embodiments for practicing the disclosure within the scope of the appended claims.

The invention claimed is:

1. A battery cell comprising:
a pouch having an inner surface defining an internal volume;
an electrolyte material contained in the internal volume of the pouch;
positive and negative electrodes configured as current collectors and positioned within the internal volume of the pouch;
positive and negative electrode terminals each connected to a respective one of the positive and negative electrodes; and
first and second intracell heat conducting members each joined to and in thermal communication with a respective one of the positive and negative electrode terminals, the first and second intracell heat conducting members being positioned fully inside the internal volume of the pouch within the electrolyte material, wherein each of the intracell heat conducting members extends between the respective one of the electrodes and the inner surface of the pouch.

2. The battery cell of claim 1, wherein each of the electrodes is arranged in a respective plane each parallel to a respective plane of the respective intracell heat conducting member, such that the intracell heat conducting members each forms a respective parallel heat transfer path with respect to the planes of the electrodes.

3. The battery cell of claim 1, wherein the positive and negative electrode terminals each extends from a respective opposite edge of the pouch.

4. The battery cell of claim 1, wherein the positive and negative electrode terminals extend from a common edge of the pouch.

5. The battery cell of claim 1, wherein the first intracell heat conducting member is integrally formed with the positive electrode terminal, and the second intracell heat conducting member is integrally formed with the negative electrode terminal.

6. The battery cell of claim 1, wherein the first intracell heat conducting member is welded to the positive electrode terminal, and the second intracell heat conducting member is welded to the negative electrode terminal.

7. The battery cell of claim 1, wherein the first intracell heat conducting member is attached to the positive electrode and the second intracell heat conducting member is attached to the negative electrode terminal by an electrically insulating adhesive material.

8. The battery cell of claim 1, wherein the first intracell heat conducting member is configured as a positive electrode plate, and the second intracell heat conducting member is configured as a negative electrode plate.

9. The battery cell of claim 1, wherein each of the first and second intracell heat conducting members is constructed at least partially of an electrically insulating material.

10. The battery cell of claim 1, wherein the positive and negative electrodes include a lithium chemistry-based active material.

11. The battery cell of claim 1, wherein the electrolyte material includes an electrolyte fluid that fills the internal volume of the pouch.

12. A battery pack comprising:
a housing; and a plurality of battery cells positioned within the housing, each of the battery cells including:
  a pouch having an inner surface defining an internal volume;
  an electrolyte material contained in the internal volume of the pouch;
  positive and negative electrodes positioned within the internal volume of the pouch;
  positive and negative electrode terminals each connected to a respective one of the positive and negative electrodes; and
  first and second intracell heat conducting members each joined to and in thermal communication with a respective one of the positive and negative electrode terminals, both the first and second heat conducting members being positioned fully inside the internal volume of the pouch within the electrolyte material, wherein each of the intracell heat conducting members extends between the respective one the electrodes and the inner surface of the pouch.

13. The battery pack of claim 12, wherein each of the positive and negative electrodes is arranged in a respective plane each parallel to a respective plane of the respective intracell heat conducting member, such that the intracell heat conducting members each forms a respective parallel heat transfer path with respect to the planes of the electrodes.

14. The battery pack of claim 12, wherein the positive and negative electrode terminals each extends from a respective opposite edge of the pouch.

15. The battery pack of claim 12, wherein the positive and negative electrode terminals extend from a common edge of the pouch.

16. The battery pack of claim 12, wherein the first intracell heat conducting member is integrally formed with the positive electrode terminal, and the second intracell heat conducting member is integrally formed with the negative electrode terminal.

17. The battery pack of claim 12, wherein the first intracell heat conducting member is welded to the positive electrode terminal, and the second intracell heat conducting member is welded to the negative electrode terminals.

18. The battery pack of claim 12, wherein the first intracell heat conducting member is attached to the positive electrode and the second intracell heat conducting member is attached to the negative electrode terminal by an electrically insulating adhesive material.

19. The battery pack of claim 12, wherein the electrolyte material includes an electrolyte fluid that fills the internal volume of the pouch.

20. The battery pack of claim 12, wherein the positive and negative electrodes include a lithium ion chemistry-based active material.

* * * * *